US007030743B2

(12) United States Patent
Morris

(10) Patent No.: US 7,030,743 B2
(45) Date of Patent: *Apr. 18, 2006

(54) TIRE PRESSURE INDICATOR PROVIDING A VISUAL INDICATION OF TIRE PRESSURE

(75) Inventor: Jason A. Morris, Melrose, MA (US)

(73) Assignee: Tagg Technology Corp., Arlington, MA (US)

( * ) Notice: Subject to any disclaimer, the term of this patent is extended or adjusted under 35 U.S.C. 154(b) by 182 days.

This patent is subject to a terminal disclaimer.

(21) Appl. No.: 10/687,066

(22) Filed: Oct. 16, 2003

(65) Prior Publication Data

US 2004/0083944 A1  May 6, 2004

Related U.S. Application Data

(60) Provisional application No. 60/423,867, filed on Nov. 5, 2002.

(51) Int. Cl.
B60C 23/02 (2006.01)

(52) U.S. Cl. ............... 340/442; 340/444; 340/447; 340/448; 340/450; 116/34 R

(58) Field of Classification Search ............ 340/442, 340/444, 447, 448, 450; 73/146.4, 146.8, 73/714, 744; 116/34 R, 266, 270
See application file for complete search history.

(56) References Cited

U.S. PATENT DOCUMENTS

| 3,508,193 A | 4/1970 | Giovannelli et al. .......... 340/58 |
| 3,537,068 A | 10/1970 | Amundsen, Jr. ............. 340/58 |
| 3,670,688 A | 6/1972 | Seaberg ....................... 116/34 |
| 3,719,198 A | 3/1973 | Wilhelm et al. ............ 137/228 |
| 3,760,350 A | 9/1973 | Johnson ....................... 340/58 |
| 3,889,530 A | 6/1975 | Bluem ....................... 73/146.8 |
| 3,906,988 A | 9/1975 | Mottram ..................... 137/227 |
| 3,938,078 A | 2/1976 | Davis et al. ................. 340/58 |
| 3,994,312 A | 11/1976 | Tanner et al. .............. 137/226 |
| 3,999,431 A | 12/1976 | Makarainen .............. 73/146.5 |
| 4,072,048 A | 2/1978 | Arvan ...................... 73/146.8 |
| 4,103,549 A | 8/1978 | Schmidt ................... 73/146.8 |
| 4,116,157 A | 9/1978 | Evans ........................ 116/125 |
| 4,136,560 A | 1/1979 | Gellos ...................... 73/146.8 |
| 4,159,465 A | 6/1979 | Hatcher ...................... 340/58 |
| 4,362,121 A | 12/1982 | Pegram ................... 116/34 R |
| 4,464,929 A | 8/1984 | Willis ....................... 73/146.8 |
| 4,606,391 A | 8/1986 | Achterholt ................. 152/431 |
| 4,819,686 A | 4/1989 | Achterholt ................. 137/229 |
| 4,944,323 A | 7/1990 | Bartholomew et al. ..... 137/227 |

(Continued)

Primary Examiner—Hung Nguyen
(74) Attorney, Agent, or Firm—Weingarten, Schurgin, Gagnebin & Lebovici LLP

(57) ABSTRACT

An tire pressure indicator operative to provide a first visual indication if the tire pressure within a tire to which the indicator is coupled is below a first predetermined pressure and a second different visual indication if the tire pressure is above a second predetermined pressure. The indicator includes first and second magnetic members rotatably mounted within a housing that includes a transparent portion. The first magnetic member rotates in response to air pressure applied to a diaphragm that is mechanically coupled to the first magnetic member. The second magnetic member includes portions having first and second visual characteristics that are viewable through a transparent portion. The second magnetic member is cooperative with the first magnetic member to rotatably orient the second magnetic member such that the first or second visual characteristic is visible through the transparent portion.

12 Claims, 2 Drawing Sheets

U.S. PATENT DOCUMENTS

| | | | |
|---|---|---|---|
| 5,007,365 A | 4/1991 | Hwang | 116/34 R |
| 5,115,832 A | 5/1992 | Higdon et al. | 137/227 |
| 5,365,967 A | 11/1994 | Moore | 137/226 |
| 5,386,794 A | 2/1995 | Foss et al. | 116/34 R |
| 5,569,849 A | 10/1996 | Cumming | 73/146.8 |
| 5,641,902 A | 6/1997 | Hong | 73/146.8 |
| 5,774,048 A * | 6/1998 | Achterholt | 340/447 |
| 5,819,779 A | 10/1998 | Takemura et al. | 137/229 |
| 5,856,619 A | 1/1999 | Wang | 73/146.5 |
| 6,531,960 B1 | 3/2003 | Gladstone et al. | 340/442 |

* cited by examiner

TIRE PRESSURE INDICATOR PROVIDING A VISUAL INDICATION OF TIRE PRESSURE

CROSS REFERENCE TO RELATED APPLICATIONS

This application claims the benefit of application Ser. No. 60/423,867 filed Nov. 5, 2002.

STATEMENT REGARDING FEDERALLY SPONSORED RESEARCHED OR DEVELOPMENT

Not Applicable

BACKGROUND OF THE INVENTION

This invention is directed to a tire pressure indicator that can be readily installed on valve stems of vehicle tires to provide a visible indication when the tire pressure is above or below predetermined limits.

Proper maintenance of tire pressure is important in the operation of a motor vehicle for a number of reasons. First, it is noted that under inflation of vehicular tires is the leading cause of tire failure. Second, the maintenance of proper tire inflation promotes more even tread wear and thus increases the life of the tire. Lastly, a vehicle with properly inflated tires will exhibit greater gas mileage than a vehicle with under inflated tires.

Tire failure is generally caused by overheating which is typically caused by under inflation of the tire and/or by overloading of the vehicle. More specifically, tire heating is caused by the normal flexure of the tire sidewalls and road friction. If the tires are properly inflated, the sidewalls will be stiff and sidewall flexure will be reduced. However, if the tires are under inflated, greater sidewall flexure along with tire heating results. Thus, in the circumstance in which tires are under inflated, overheating and tire failure are more likely to occur.

Various tire pressure measurement devices have been developed to allow the measurement of tire pressure. For example, hand-held tire pressure gauges are well known. The user typically slides such a pressure gauge over the valve stem of the tire until the gauge seals with the value stem so as to minimize the escape of air during the measurement process. Once the gauge has been appropriately positioned, the user notes the pressure value displayed on the gauge. The user then compares the measured value to the tire pressure value recommended by the tire manufacturer to determine if the tire is under inflated. The user must either refer to a manual or other source for this information or commit this value to memory.

Mechanical tire pressure gauges of the above-described type typically require a great deal of user intervention and do not provide a constant and instantaneous indication of whether the tire is under inflated. Tire pressure is often not measured due to the inconvenience associated with the use of typical mechanical tire pressure gauges and consequently drivers are often operating their vehicles on under inflated tires.

It would therefore be desirable to have a tire pressure indicator that may be installed on the valve stem and left in place so as to provide a visual indication that a tire is underinflated.

BRIEF SUMMARY OF THE INVENTION

A tire pressure indicator is disclosed. The tire pressure indicator is coupled to a tire via the valve stem and provides a first visual indication if the tire pressure is below a first predetermined pressure and a second different visual indication if the tire pressure is above a second predetermined pressure. The indicator thus provides motorists with a visual indication if a tire is underinflated.

More specifically, the indicator includes a base having internal threads sized to permit threaded mating of the base with male threads of a conventional valve stem. The indicator further includes a housing having first and second ends, a transparent cover, and first and second rotatable magnetic members rotatably mounted within the housing.

A pressure to linear motion translator in the form of a flexible elastomeric diaphragm is mounted within the housing and is securely retained between the housing and the base. The base includes a threaded opening at one end for threaded coupling to the valve and at least one air passage that extends through the base to permit air pressure in a tire to be coupled to the diaphragm. When the air pressure is below a first predetermined value, the diaphragm is generally undeformed. When the air pressure applied to the base of the indicator is above a second predetermined value, the diaphragm deforms. A linkage arm is provided that is coupled to the diaphragm and a point on the first magnetic member. The application of air pressure above the second predetermined value causes the diaphragm to deform and causes the first magnetic member to rotate from a first rotational orientation in which one magnetic pole is adjacent the second magnetic member to a second rotational orientation in which the other magnetic pole is adjacent the second magnetic member.

First and second colors or first and second visual indicia are provided on the portions of the second magnetic member associated with the north and south poles. Consequently, the rotation of the first magnetic member causes rotational movement of the second magnetic member such that a first colored portion of the second magnetic member is visible through the transparent cover in the circumstance in which the air pressure applied to the base is below the first predetermined value and a second different colored portion of the second magnetic member is visible through the transparent cover when the air pressure applied to the base is above the second predetermined value.

In the foregoing manner, a visual indication of whether the tire pressure is below a first predetermined value or above a second predetermined value is provided.

Other features, aspects and advantages of the invention will be apparent to those of ordinary skill in the art from the Detailed Description of the Invention that follows.

BRIEF DESCRIPTION OF THE SEVERAL VIEWS OF THE DRAWINGS

The invention will be more fully understood by reference to the following Detailed Description of the Invention in conjunction with the drawings of which.

DETAILED DESCRIPTION OF THE INVENTION

The present application hereby incorporates by reference the disclosure of U.S. Provisional Patent Application No. 60/423,867 filed Nov. 5, 2002 and entitled Low Tire Pressure Indicator.

A low tire pressure indicator is disclosed. The low tire pressure indicator provides a first visual indication if the tire pressure is below a first predetermined pressure value and a second different visual indication if the tire pressure is above a second predetermined pressure value. In one embodiment, the first and second predetermined pressure values are the same.

Figure 1:
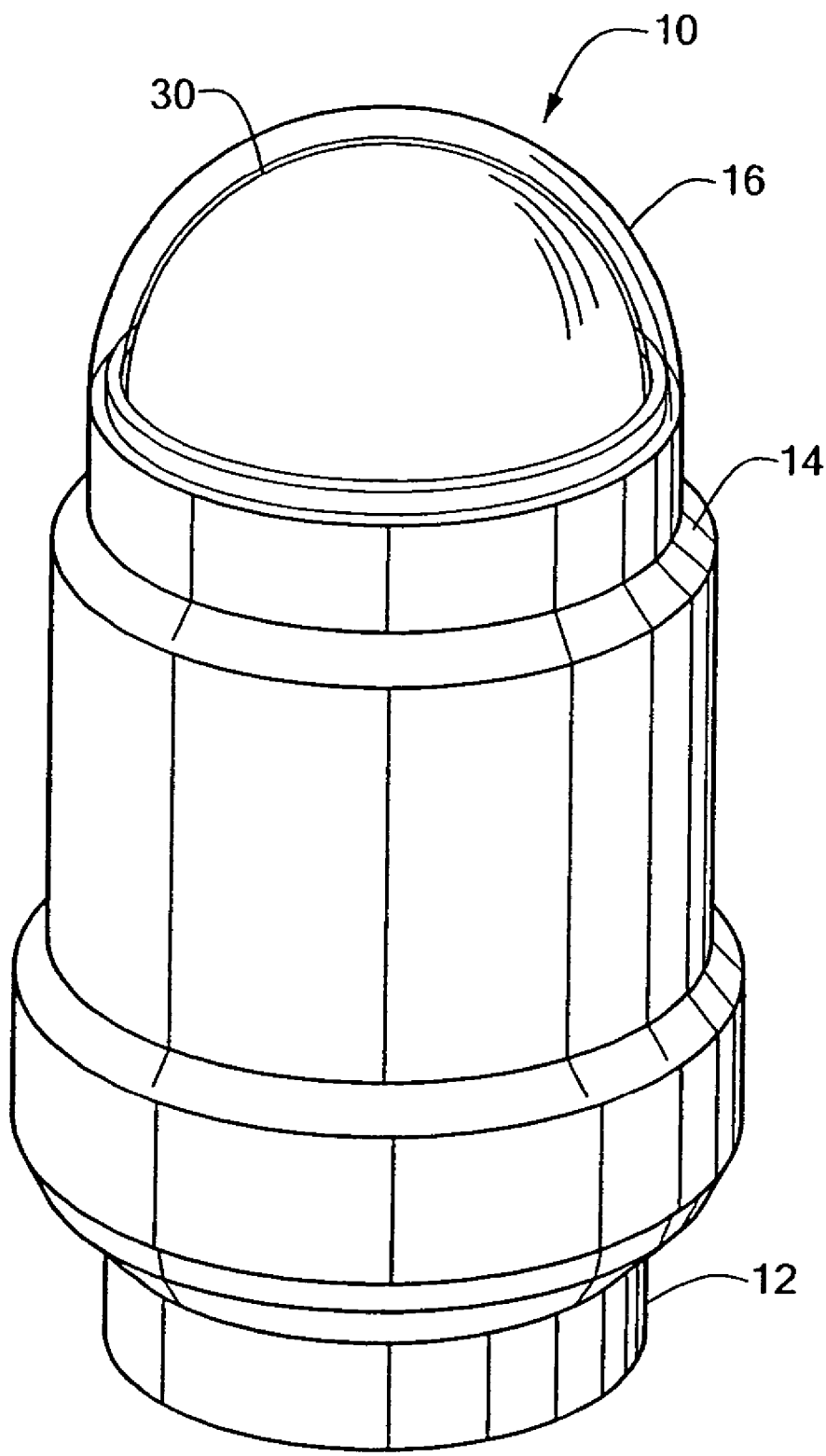
FIG. 1 is a perspective view of a tire pressure indicator in accordance with the present invention.
Figure 2:
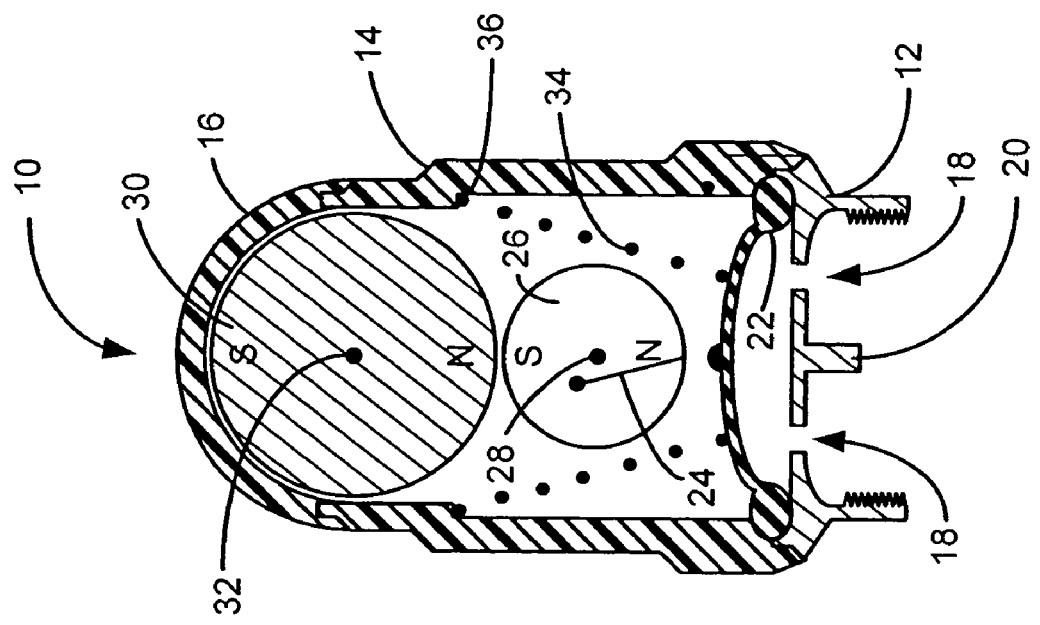
FIG. 2 is a cross-sectional view of the tire pressure indicator of FIG. 1 with the tire pressure indicator depicted with an air pressure below a predetermined value applied to the tire pressure indicator.
Figure 3:
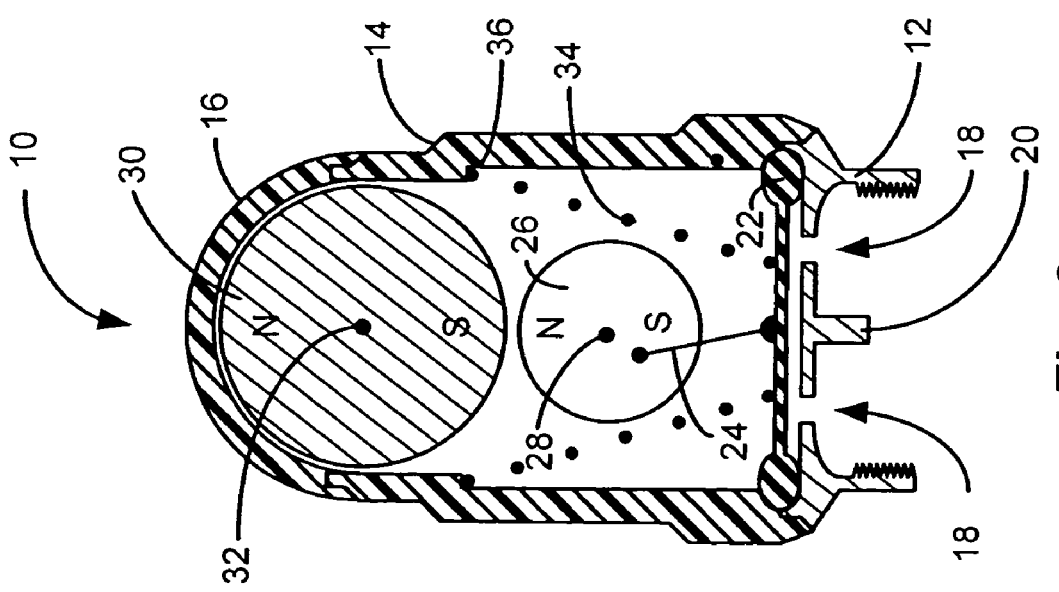
FIG. 3 is a cross-sectional view of the tire pressure indicator of FIG. 1 with the tire pressure indicator depicted with an air pressure above a predetermined value applied to the tire pressure indicator.

FIGS. 1–3 depict a tire pressure indicator in accordance with the present invention. The indicator 10 includes a base 12 that engages the threads of a tire valve stem (not shown). The indicator 10 further includes a housing 14 having a first end adjacent the base 12 and a second opposing end. The first end of the housing 14 is mounted to the base 12. The base is preferably metallic but may alternatively be fabricated of plastic. The housing 14 may be mounted to the base 12 via an interference fit or alternatively, via an adhesive. A transparent cover or dome 16 is mounted to or is integral with the second end of the housing 14. More specifically, the transparent cover 16 may be molded from a clear polycarbonate material or any suitable clear plastic material. When molded as a separate component from the housing 14, the cover 16 may be mounted to the housing 14 via ultrasonic welding, via an adhesive, or any other suitable mounting technique known in the art. The mounting of the cover 16 to the housing 14 should provide a seal to avoid the introduction of moisture at the location of the joint between the cover 16 and the housing 14. The transparent cover 16 and the housing 14 may also be produced via a two part molding process to produce an integral component having a transparent end. Alternatively, the housing 14 and cover 16 may be integrally formed of a transparent material and the housing portion may be partially coated or painted with an opaque coating so that only the cover 16 is transparent.

One or more air passages 18 (see FIGS. 2, 3) are provided through the base 12. The base 12 also includes a pin 20 that impinges upon the valve pin within the valve stem of a tire when the base 12 is threaded onto the cooperative male threads of the valve stem (not shown). The air passages 18 open to a flexible elastomeric diaphragm 22 that is captively retained between the base 12 and the housing 14 so as to form a seal between the base 12 and the interior of the housing 14. The diaphragm 22 serves as a pressure to linear motion translator. While in the illustrated embodiment an elastomeric diaphragm is employed as the pressure to linear motion translator, any device suitable to perform this function may be substituted for the diaphragm. For example, a piston that provides an air seal to the interior of the housing 14 may be employed in the alternative. Increased air pressure in a tire results in greater deformation of the diaphragm 22 and urges the center of the diaphragm 22 away from the base 12. A linkage arm 24 having first and second ends is coupled to the center of the diaphragm 22 at the first end of the linkage arm. The second end of the linkage arm 24 is pivotally coupled to a first rotatable magnetic member or actuator 26 that has opposing north and south poles. The first end of the linkage arm 24 may comprise a ball which is pressed into a socket formed in the center of the diaphragm 22 or via any other suitable means. Similarly, the second end of the linkage arm 24 may be mounted to the actuator 26 using any technique known in the art for pivotally coupling a member to a rotatable object. For example, the linkage arm 24 may be coupled to the actuator 26 via a pivot pin.

The actuator 26 is rotatable around a first pivot axis 28. Increased air pressure applied to the diaphragm 22 through the openings 18 in the base causes greater deformation of the flexible diaphragm 22 which, in turn, causes rotational movement of the actuator 26 via the linkage arm 24. Accordingly, as depicted in FIG. 2 when air pressure below a first predetermined pressure is applied to the indicator 10, the diaphragm 22 is not significantly deformed and the actuator 26 is oriented with the south pole generally adjacent the diaphragm 22 and the north pole adjacent a second rotatable magnetic member 30. The second rotatable magnetic member 30 also has opposing north and south poles and is freely rotatable about a second pivot axis 32. The second rotatable magnetic member 30 may be fabricated in the form of a generally planar disk or alternatively as a sphere. In either case, different visual indicia are provided on portions of the second magnetic member 30 associated with opposing poles of the second member 30. For example, the portion of the second member 30 associated with the north pole may be red and the portion of the second member 30 associated with the south pole may be green. The second magnetic member 30 is rotatably mounted adjacent the actuator 26 such that a portion of the second member 30 is visible through the transparent cover 16.

When the air pressure within the tire is below the first predetermined pressure, as depicted in FIG. 2, the north pole of the actuator 26 is disposed adjacent the second member 30. The orientation of the actuator 26 with its north pole adjacent the second member 30 causes the south pole of the second member 30 to be attracted to the north pole of the actuator 26, as depicted in FIG. 2. In this orientation, the red portion (north pole) of the second member 30 is visible through the transparent cover 16 so as to provide a visual indication of a low tire pressure condition.

FIG. 3 depicts the orientation of the first and second members 26, 30 in the circumstance in which air pressure that is in excess of the second predetermined value is applied to the tire pressure indicator 10. When the pressure within the tire is above the second predetermined value, the diaphragm 22 deforms so as to cause the linkage arm 24 to move away from the base 12. The movement of the linkage arm 24 causes rotational movement of the actuator 26 around its pivot axis 28. More specifically, in response to the application of air pressure to the indicator above the second predetermined value, the actuator rotates so that its south pole is generally adjacent the second member 30. The north pole of the second member 30 is attracted to the south pole of the actuator 26 causing the second member 30 to rotate about the second pivot axis 32 until the north pole of the second member 30 is adjacent the south pole of the actuator 26. In this rotational orientation, the green portion of the second member 30 is visible through the transparent cover 16 of the indicator 10.

Thus, based upon the color of the portion of the second member 30 that is visible through the transparent cover 16 of the tire pressure indicator 10, a user can readily obtain a visual indication of whether the tire pressure is below the first predetermined value or above the second predetermined value.

A compression spring 34 having first and second ends is mounted within the housing 14. One end of the spring 34 abuts a shoulder 36 formed in the interior surface of the housing 14 and the other end of the spring abuts the diaphragm so as to urge the diaphragm into its undeflected orientation. The stiffness of the spring 34 is in part determinative of the first and second predetermined values.

While the first member 26 is depicted in the form of a disk and the second member 30 is depicted in the form of a sphere, it should be appreciated that that any suitable rotatable magnetic objects may be used for either of the members 26, 30. For example, rotatable magnetic disks, cylinders, magnetic spheres, bar magnets, and/or combinations of the above may be employed. Moreover, while the illustrated embodiment describes one orientation of magnetic poles of the magnetic members 26, 28, the polar orientation of the two members 26, 28 may be reversed without affecting the functionality of the presently disclosed low tire pressure indicator.

Additionally, while the above description is provided in terms of a tire pressure indicator, it should be appreciated that the presently disclosed indicator may be employed to provide a visual indication of whether a fluid pressure is above or below first and second predetermined values.

It will be appreciated that variations to and modifications of the above-described tire pressure indicator may be made without departing from the inventive concepts disclosed herein. Accordingly, the invention should not be viewed as limited except by the scope and spirit of the appended claims.

What is claimed is:

1. A pressure indicator comprising:
    a housing having first and second ends, said housing having a transparent portion at the second end of said housing;
    a base having first and second ends, said base having an opening defining a passage therethrough, said second end of said base being mounted to said first end of said housing;
    first and second magnetic members rotatably mounted within said housing, said second magnetic member having first and second portions with first and second different visual characteristics respectively;
    a pressure to linear motion translator coupled to said first magnetic member and operative to produce linear motion responsive to variations in pressure so as to produce rotational movement of the first magnetic member in response to variations in pressure in communication with said translator through said passage;
    in response to pressure below a first predetermined value applied to said translator through said passage, said first magnetic member being rotatable generally into a first actuator orientation and, in response to pressure above a second predetermined value applied to said translator through said passage, said first magnetic member being rotatable generally into a second different actuator orientation;
    said second magnetic member being magnetically responsive to said first magnetic member being in said first actuator oriention to rotate into a first indicator orientation in which said first visual characteristic is viewable through said transparent portion and second magnetic member being magnetically responsive to said first magnetic member being in said second actuator orientation to rotate into a second indicator orientation in which said second visual characteristic is viewable through said transparent portion.

2. The pressure indicator of claim 1 wherein said pressure to linear motion translator comprises a flexible diaphragm.

3. The pressure indicator of claim 2 wherein said diaphragm is captively retained by said base and said housing.

4. The pressure indicator of claim 2 further including a linkage arm mechanically coupling said diaphragm to said first magnetic member.

5. The pressure indicator of claim 1 wherein said second magnetic member comprises a sphere.

6. The pressure indicator of claim 1 wherein said second magnetic member comprises a disk.

7. The pressure indicator of claim 1 wherein said second magnetic member comprises a cylinder.

8. The pressure indicator of claim 1 wherein said transparent portion of said housing comprises a polycarbonate material.

9. The pressure indicator of claim 1 wherein said housing comprises a housing body and said transparent portion, wherein said transparent portion is mounted to said housing body to form said housing.

10. The pressure indicator of claim 1 wherein said first magnetic member comprises a disk.

11. The pressure indicator of claim 1 wherein said first end of said base includes interior female threads sized to receive cooperative male threads of a tire valve stem.

12. A pressure indicator configured for mounting to a valve stem having a male threaded portion, said pressure indicator comprising:
    a housing having first and second ends, said second end of said housing having a transparent portion, said housing defining a cavity;
    a base having a first end and a second end, said first end having a female threaded portion for mating with said male threaded portion of said valve stem, said base including at least one opening defining a passage between said first end and said second end of said base;
    a flexible diaphragm having first and second sides, said diaphragm mounted within said cavity and forming a seal at the first end of said housing, said diaphragm being deformable in response to pressure communicated to said first side of said diaphragm through said at least one opening;
    first and second magnetic members, said first magnetic member being rotatably mounted in said cavity in said first end of said housing and said second magnetic member being rotatably mounted adjacent said first magnetic member and in said cavity in said second end of said housing, said first and second magnetic members each having north and south poles and corresponding first and second portions of the respective magnetic members, wherein one of said first and second portions of said second magnetic member has a first visual characteristic and the other one of said first and second portions of said second magnetic member has a second different visual characteristic;
    said first magnetic member being mechanically coupled to said diaphragm and rotatable in response to deformation of said diaphragm caused by variations in pressure such that one of said north and south poles of said first magnetic member is generally adjacent said second magnetic member when said pressure is below a first predetermined value and the other one of said north and south poles of said first magnetic member is generally adjacent said second magnetic member when said pressure is above a second predetermined value;
    said second magnetic member being magnetically cooperative and rotatable with respect to said first magnetic member such that said first visual characteristic is viewable through said transparent portion of said housing when said pressure is below said first predetermined value and said second visual characteristic is viewable through said transparent portion when said pressure is above said second predetermined value.

* * * * *

UNITED STATES PATENT AND TRADEMARK OFFICE
CERTIFICATE OF CORRECTION

| | | |
|---|---|---|
| PATENT NO. | : 7,030,743 B2 | Page 1 of 1 |
| APPLICATION NO. | : 10/687066 | |
| DATED | : April 18, 2006 | |
| INVENTOR(S) | : Jason A. Morris | |

It is certified that error appears in the above-identified patent and that said Letters Patent is hereby corrected as shown below:

Column 1, line 11, "RESEARCHED" should read --RESEARCH--.

Signed and Sealed this

Twenty-fifth Day of December, 2007

JON W. DUDAS
*Director of the United States Patent and Trademark Office*